United States Patent [19]

Turban

[11] Patent Number: 5,586,166
[45] Date of Patent: Dec. 17, 1996

[54] CHIP CARD

[75] Inventor: Karl-Albert Turban, Leonberg, Germany

[73] Assignee: Alcatel N.V, Amsterdam, Netherlands

[21] Appl. No.: 516,896

[22] Filed: Aug. 18, 1995

Related U.S. Application Data

[63] Continuation of Ser. No. 202,274, Feb. 25, 1994, abandoned.

[30] Foreign Application Priority Data

Mar. 6, 1993 [DE] Germany .......................... 43 07 122.8

[51] Int. Cl.⁶ .............................. H04M 1/64; H04Q 7/04; H04L 9/00
[52] U.S. Cl. .............................. 379/58; 379/88; 379/357; 379/189; 379/216; 379/201; 235/379; 235/380
[58] Field of Search ................................ 379/58, 59, 60, 379/63, 67, 88, 89, 197, 355, 357, 58, 59, 60, 63, 201, 216, 198, 199, 189; 235/379, 380, 492, 482

[56] References Cited

U.S. PATENT DOCUMENTS

| | | | |
|---|---|---|---|
| 4,677,657 | 6/1987 | Nagata et al. | 379/88 |
| 4,680,785 | 7/1987 | Akiyama et al. | 379/357 |
| 4,759,056 | 7/1988 | Akiyama | 379/197 |
| 4,868,376 | 9/1989 | Lessin et al. | 235/492 |
| 4,961,217 | 10/1990 | Akiyama | 379/89 |
| 4,983,816 | 1/1991 | Iijima | 235/379 |
| 5,119,414 | 6/1992 | Izumi | 379/216 |
| 5,138,655 | 8/1992 | Takashima et al. | 379/357 |
| 5,185,788 | 2/1993 | Matsumoto et al. | 379/357 |
| 5,197,092 | 3/1993 | Bamburak | 379/357 |
| 5,335,276 | 8/1994 | Thompson et al. | 379/357 |
| 5,420,912 | 5/1995 | Kopp et al. | 379/63 |

FOREIGN PATENT DOCUMENTS

| | | |
|---|---|---|
| 0513507 | 11/1992 | European Pat. Off. . |
| 2661762 | 11/1991 | France . |
| 3428237 | 2/1986 | Germany . |
| 3732109 | 6/1988 | Germany . |
| 3744841 | 6/1988 | Germany . |
| 3807997 | 9/1988 | Germany . |
| 3835479 | 10/1988 | Germany . |
| 3721360 | 1/1989 | Germany . |
| 3736854 | 5/1989 | Germany . |
| 9006238 | 8/1990 | Germany . |
| 4119924 | 12/1992 | Germany . |
| 4307126 | 3/1993 | Germany . |
| 4201197 | 7/1993 | Germany . |
| 2270424 | 5/1990 | Japan . |

OTHER PUBLICATIONS

Matsuo, Personal Telephone Service using IC–Cards Jun. 1989, pp. 41–48, IEEE Communications Magazine.

(List continued on next page.)

Primary Examiner—Thomas W. Brown
Assistant Examiner—Parag Dharia
Attorney, Agent, or Firm—Ware, Fressola, Van Der Sluys & Adolphson

[57] ABSTRACT

A first chip card is provided for use in a telecommunications terminal which is connected in a telecommunications network. The first chip card exchanges signaling and data directly with the telecommunications network at the telecommunications terminal. The first chip card includes a signaling and dam processor for processing the signaling and data exchanged with the telecommunications network and a signaling and data memory for storing signaling and data received from the telecommunications network and for storing signaling and data processed by the signaling and data processor. A telecommunications protocol processor of the first chip card processes multiple telecommunications protocols including both telecommunications protocols for radios and telecommunications protocols for wired communications. When the first chip card is inserted in the telecommunications terminal, the functionality of the telecommunications terminal is solely determined by the first chip card. A plurality of chip cards may be inserted in the telecommunications terminal, and the first chip card is further capable of checking whether at least one further chip card is inserted in the telecommunications terminal. The first chip card is also capable of exchanging signaling and data with another chip card in the telecommunications terminal.

9 Claims, 2 Drawing Sheets

OTHER PUBLICATIONS

"Offentliches Kartentelefonsystem der DBP", P. Muller, *Unterrichtsblatter F*, vol. 42/1989/No. 11, pp. 391–401.

"Mobile Kommunikation mit HICOM–Chipkarte", M. Allerbeck et al, *Telcom Report 9*, (1986), vol. 4, pp. 270–272.

"Karten mit Kopfchen", P. Graf, *Funkschau* May 1989, pp. 54–58.

"Karten mit Gedachtnis", V. Schrother, *Funkschau*, Jul. 1988, pp. 50–52.

"Von der Telefonkarte zur Cryptokarte", J. Hammerschmitt et al, *Telecom Report 14*, 1991, pp. 158–161.

"Chip Cards (Memocards) and Telecommunications", G. Lissandrello, *Pacific Telecommunications Council*, Honolulu HI, 1986, pp. 166–175.

"Smart–Card bietet Datenschutz", R. Ungerer, *Design & Elektronik* 10, May 5, 1992, pp. 62–63.

"Multimedium Chipkarte: Informationstrager, Sicherheitswerkzeug, Wertkarte", K. Wolfenstetter, *Telekom Praxis* Mar. 1993, pp. 33–39.

"Sicherheit per Chipkarte", *Funkschau*, 21/1992, pp. 30–31.

IEEE Communications Magazine, Bd. 27, Nr. 7, Jul. 1989, New–York pp. 41–48, Naoki Matsuo et al. "Personal Telephone Services Using IC–Cards".

CA Conference Article, Bd. 121, 1992, Bad Nauheim, pp. 303–313 Hartleif "Die Multifunktionale Chipkarte an Kommunikationsendgeräten".

CHIP CARD

This is a continuation of application Ser. No. 08/202,274 filed on Feb. 25, 1994 and now abandoned.

TECHNICAL FIELD

The invention relates to telecommunications and, more particularly, to a chip card and its possibilities of application.

BACKGROUND OF THE INVENTION

In the state of the art, chip cards are also known under the name of Smart-Cards or Memocards. Other known forms of card configurations are magnetic strip cards, hologram cards and laser cards. In addition, memory cards are known in the state of the art, which only consist of storage units with non-volatile memory, but do not possess any built-in intelligence. ("Chip Cards (Memocards) and Telecommunications"; George J. Lissandrello, Pacific Telecommunications Council; Honolulu, USA, 1986; pages 166–175). In contrast to these three types of cards, the chip card (Smart-Card) has a built-in "intelligence", with which calculation operations can be performed and access to the memory in the card can be controlled. These chip cards are used as "electronic money", as "electronic keys" or as "portable information storage". For example, when used for telecommunications, often dialed telephone numbers can be stored in the chip card, and recalled in public telephones under the "abbreviated address dialing" service feature ("Chip Cards; Cards with Memory"; Eberhard Schröther; Funkschau [Radio Show] 7/1988, pages 50–52).

Considerable memory and calculation capabilities can be implemented on a chip card, because of the increasingly improving semiconductor technology, whereby ever more functions can be stored in the same space due to the smaller size of the structures. Such chip cards with special control and safety logic serve as "electronic money", where the card is used in the form of a "prepaid card" or in the form of a "bookkeeping card". Furthermore, such cards allow access control ("From the Telephone Card to the Crypto-card"; Jürgen Hammerschmitt and Gert Krings; Telecom Report 14 (1991), volume 3; pages 158–161).

DISCLOSURE OF INVENTION

The invention has the task of developing a chip card that is increasingly able to accept and perform more functions.

According to the present invention, a chip card for use in telecommunications terminals comprises first means for receiving signaling and useful data, second means for handling telecommunications protocols, third means for processing the signaling and useful data, and a memory for storing the received and processed signaling and useful data.

An advantage of the invention lies in the fact that the functionality of a telecommunications terminal is independent of the terminal itself. The functionality of the terminal is solely determined by the use of the chip card. This, in turn, has the advantage that with the chip card, every telecommunications subscriber has available a terminal with the desired service elements or features, in any place and at any time. The terminal itself can be made available in a simple and cost-effective configuration.

Another advantage of the invention is significantly increased protection against unauthorized access to the personal data of telecommunication terminals users. The protection against misuse of a telecommunications terminal is increased, because without the chip card the terminal offers no, or almost no functionality, and can therefore no longer be used by unauthorized persons without the chip card.

Another significant advantage of the invention lies in the fact that user-relevant data are stored directly in the chip card. Because of the direct storage of user-relevant data, such data need not to be transmitted over long distances, e.g., from a main data bank to the telecommunications terminal, which considerably reduces the signaling load.

According further to the present invention, the chip card can be used together with at least one other chip card in the same telecommunications terminal, wherein the chip card further comprises fourth means for checking whether the at least one further chip card is inserted in the telecommunications terminal.

These may be chip cards of the same type, or of a different type. To enable the simultaneous use of several chip cards, every chip card must have the means to test whether another card has been inserted into the telecommunications terminal.

In further accord with the present invention, the chip card is also used in telecommunication terminals to process a digital cellular telephone protocol, e.g., the Group Speciale Mobile (GSM) protocol of the CEPT regional international telecommunications organization or Integrated Services Digital Network (ISDN) protocol. There is furthermore the possibility of processing both GSM and ISDN protocols by means of the chip card. The processing of protocols is made possible by the means of processing telecommunication protocols on the chip card.

In still further accord with the present invention, the chip card can be used to perform telecommunication services. Such telecommunication services comprise services such as data communication, teletex, telefax, graphic services and telephones, for example.

According still further to the present invention, service features and/or macro commands can be stored on the card. The service features and/or macro commands are stored in the chip card's memory.

According further to the present invention, the chip card is used to exchange signals and useful data between the chip card and a telecommunications network. The chip card makes direct data exchange between telecommunications network and chip card possible, and not first between chip card and telecommunications terminal and then between telecommunications terminal and telecommunications network.

Still further in accord with the present invention, the chip card of the invention can be used for the exchange of signals and useful data between two equal or different chip cards in the same telecommunications terminal. There is also the possibility of exchanging data between two equal or different chip cards in different telecommunication terminals.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
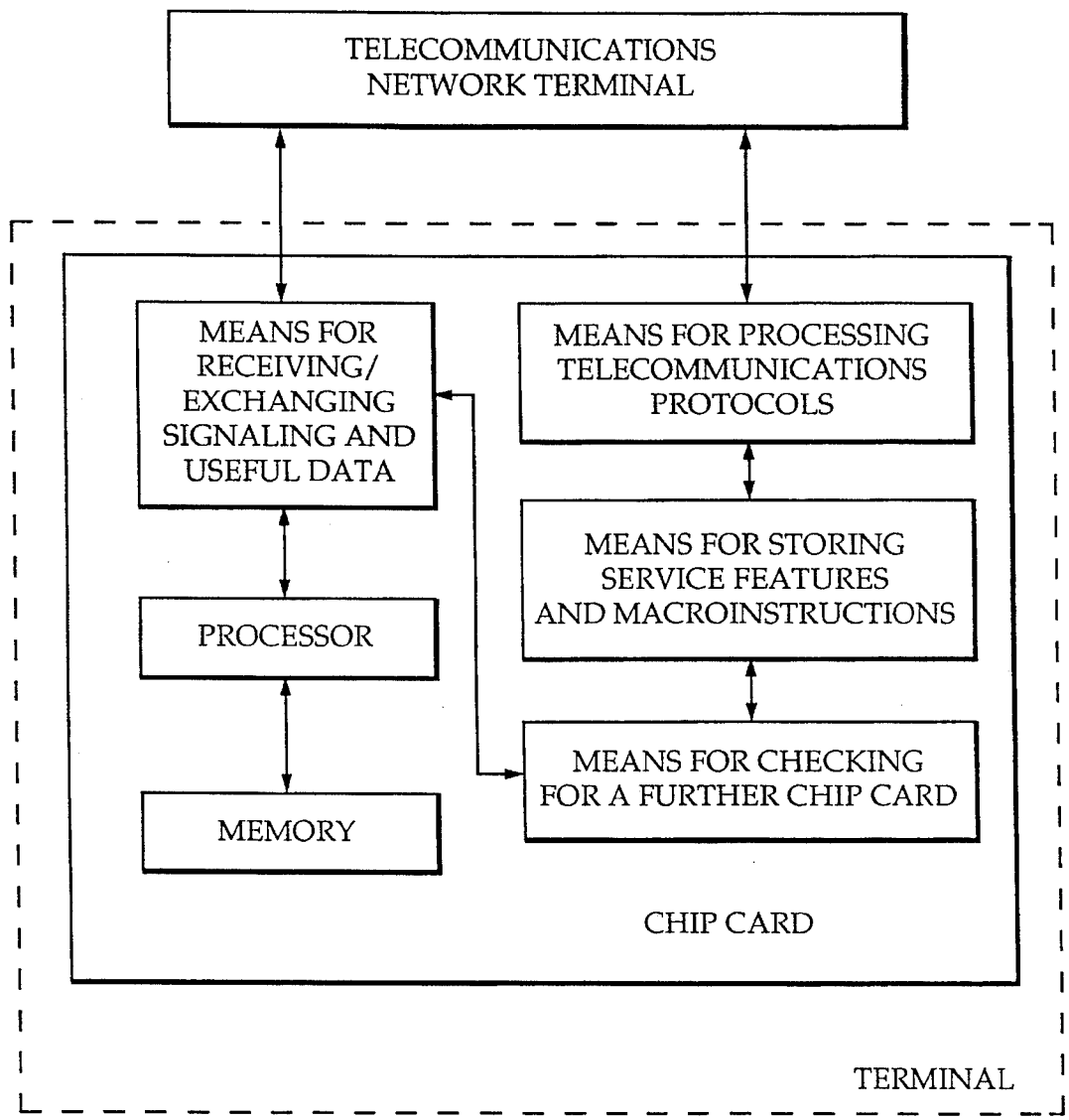
FIG. 1 is a schematic block diagram of a chip card according to the present invention.

Referring to FIG. 1, the chip card according to the invention comprises, among other things, of a processor and a memory. The processor provides calculations for the rapid processing of data.

Furthermore, the chip card contains first means for receiving signals and useful data. Second means serve to process telecommunication protocols and third means serve to process the signals and useful data inside the chip card.

The memory is used to store the received signals and useful data and to store the signals and useful data that were processed inside the chip card. In addition, service features and/or macro commands can be stored in the memory. A macro command contains a series of micro commands. Calling up the macro command triggers the series of micro commands, which are then carried out.

The first means serves to receive signals and useful data. The signals and useful data are directly transmitted, for example, from a telecommunications network to the chip card, which is inserted into a telecommunications terminal. The chip card comprises fourth means for checking whether a further chip card has been installed into the same telecommunications terminal. If a further chip card has been so inserted, the two chip cards can receive signals and useful data from one another. In this regard, see commonly-owned, copending U.S. patent application Ser. No. 08/202,340 entitled "Telecommunications Equipment", which shows, in connection with FIG. 1 thereof, a schematic side view of such a terminal, and in connection with FIGS. 2 and 3 thereof, schematic block diagrams of examples of such terminals. The chip card is also able to receive data if it is not inserted into the same telecommunications terminal, but into a different one. The chip card from which the data are received can be a chip card of the same type, but it is also possible for the chip card to be of a different type, for example a conventional chip card.

The second means processes telecommunication protocols, e.g., through the chip card. For example, the chip card can process protocols providing the identification and authentication of a telecommunications network user. In this way, with the help of the chip card, a user identifies himself as an authorized user. With the authentication, the user is also granted the service features that are available to him.

Since the chip card processes the telecommunication protocols, a user can undertake this anywhere and at any time, regardless of the type of telecommunications terminal.

The third means are used to process signals and useful data inside the card. For example, received data, which are stored in the memory, can be read and processed by the chip card and stored again in the memory. However, the processed data can also be read by the chip card.

In the following, the use of a chip card according to the invention is explained by a configuration example and the figure.

Figure 2:
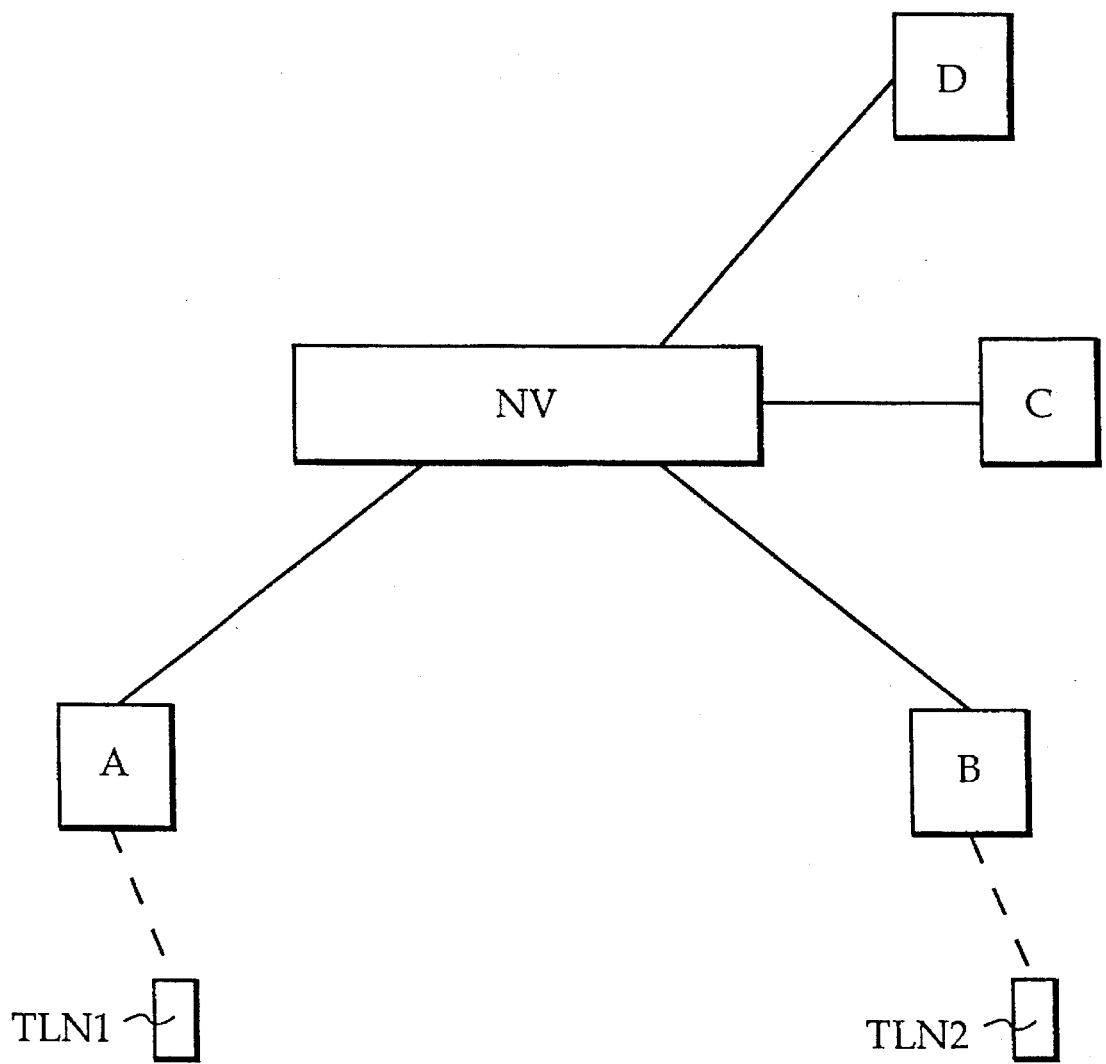
FIG. 2 is a schematic block diagram of, a circuit for a configuration example of a chip card, according to the present invention.

A premise of the configuration example is that a telecommunications subscriber wishes to establish a connection with another telecommunications subscriber who is already known to him, and that a connection had already been established at least once, as described in German Patent Application P 43 07 123.6 in connection with FIGS. 2 and 3 thereof.

For example, referring to FIG. 2, a telecommunications terminal is located in each of four different places A, B, C, D. Each terminal is equipped with a reading device for one or more equal or different chip cards.

A first subscriber TLN1 is located in the area of telecommunications terminal A, and has inserted his personal chip card into the telecommunications terminal.

A second subscriber TLN2 is located in the area of telecommunications terminal B, and has also inserted his personal chip card.

All telecommunication terminals are connected to a communications switching device NV by a telecommunications network.

For example, the first subscriber TLN1 wishes to call the second subscriber TLN2. However, the first subscriber TLN1 does not know the location of the second subscriber TLN2. It is possible for the second subscriber TLN2 to be located at either telecommunications terminal B or C or D.

Since the second subscriber TLN2 is a client who must be, or already is, called frequently, a place with his most frequent potential location, or several places with his staggered frequent potential location, can be determined.

In the event the place where the telecommunications terminal B is located corresponds, e.g., to the working place of the second subscriber TLN2, the probability of his being there in the daytime is very high.

In the event the telecommunications terminal C is a public telephone, the probability of the second subscriber TLN2 being there at any time is very low.

In the third instance, the telecommunications terminal could be located in the automobile of the second subscriber TLN2, for example. The probability of being in that location would be greatest before the start of work or after hours.

Any other location of a telecommunications terminal can be envisioned.

The different probable locations in several places or the place of the most probable location are stored in the chip card of the first subscriber TLN1.

When trying to establish a connection, e.g., a telephone connection from the first subscriber TLN1 to the second subscriber TLN2, the place with the highest location probability is dialed first, i.e. an attempt is made to establish a connection.

The connection is made by the chip card, which is able to process protocols, therefore signaling protocols.

The chip card of the first subscriber TLN1 then identifies the chip card of the second subscriber TLN2 at the terminal B place.

If the second subscriber TLN2 has not inserted his chip card in any telecommunications terminal location that stores a probability of location, the connection is made in accordance with the known method via the communications switching device NV.

Depending on the chip card's programming, the probability of the location of other, eventually many, subscribers can be stored there.

In the following, the use of the chip card will be explained by means of another example.

The chip card has means for processing telecommunication protocols, therefore also signaling protocols. Processing of the signaling protocol serves, e.g., to establish a connection with another chip card, which has been inserted into a telecommunications terminal. After a connection has been established, telecommunication services such as, e.g., data transmission can be performed.

A special example would be, e.g., when a user has inserted a chip card into a telephone, but wishes to receive a telefax. With the chip card the user is in a position to establish a connection with a telefax device. Thus, after a connection has been established, the telecommunication service of data transmission can take place from the telephone to the telefax device.

In the event the telefax device cannot be reached at the moment, it would furthermore be possible for the chip card to receive and store the data. But if a telefax device is available, the stored data can be transmitted from the chip card to the telefax device and printed out.

In addition, service features and/or macro commands can be stored on the chip card. Thus, a chip card user carries his specially wanted service features with him. Macro commands can also be retrieved, i.e. a series of micro commands can be carried out by retrieving a macro command.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A first chip card for use in telecommunications terminals of a telecommunications network, comprising:
   first means for receiving signaling and data from the telecommunications network at one of the telecommunications terminals,
   second means for processing both telecommunications protocols for radios and telecommunications protocols for wired communications,
   third means for processing the signaling and data,
   a memory for storing the received and processed signaling and data, wherein the functionality of said one of the telecommunications terminals is solely determined by the first chip card;
   wherein said one of the telecommunications terminals may be used with at least one further chip card and said first chip card comprising fourth means for checking whether the at least one further chip card is inserted in said one of the telecommunications terminals; and
   wherein said first means exchanges signaling and data between said first chip card and at least one like chip card or at least two different chip cards in a same telecommunications terminal and in different telecommunications terminals.

2. The first chip card claimed in claim 1 wherein said telecommunications protocols for radios includes GSM protocols and wherein said telecommunications protocols for wired communications includes ISDN protocols.

3. The first chip card claimed in claim 2 further comprising means for implementing telecommunications services.

4. The first chip card claimed in claim 1 further comprising means for implementing telecommunications services.

5. The first chip card claimed in claim 1 further comprising means for storing service features of the telecommunications network and macroinstructions.

6. The first chip card claimed in claim 1 wherein said first means exchanges signaling and data between the first chip card and the telecommunications network.

7. The first chip card claimed in claim 1 further comprising means for storing service features of the telecommunications network or macroinstructions.

8. A first chip card for use in a telecommunications terminal which is connected in a telecommunications network, comprising:
   means for exchanging signaling and data with the telecommunications network at the telecommunications terminal, said means for exchanging signaling and data directly exchanging data between the telecommunications network and the first chip card;
   a signaling and data processor for processing the signaling and data exchanged with the telecommunications network;
   a signaling and data memory for storing signaling and data received from the telecommunications network and for storing signaling and data processed by said signaling and data processor;
   a telecommunications protocol processor for processing multiple telecommunications protocols including both telecommunications protocols for radios and telecommunications protocols for wired communications;
   wherein when said first chip card is inserted in the telecommunications terminal, the functionality of the telecommunications terminal is solely determined by the first chip card;
   wherein a plurality of chip cards may be inserted in the telecommunications terminal, and wherein said first chip card further comprises checking means for checking whether at least one further chip card is inserted in the telecommunications terminal; and
   wherein said means for exchanging signaling and data exchanges signaling and data between said first chip card and at least one like chip card or at least two different chip cards in the telecommunications terminal.

9. A first chip card as claimed in claim 8 further comprising memory means for storing service features of the telecommunications network and for storing macro instructions which include a series of micro commands.

* * * * *

UNITED STATES PATENT AND TRADEMARK OFFICE
CERTIFICATE OF CORRECTION

PATENT NO. : 5,586,166
DATED : December 17, 1996
INVENTOR(S) : Turban

It is certified that error appears in the above-indentified patent and that said Letters Patent is hereby corrected as shown below:

On the title page, item [56] recites "9006238  8/1990  Germany" should read --9006238  9/1990  Germany--

On the title page, item [57], line 6, recites "dam processor" should read --data processor--

Signed and Sealed this

Twentieth Day of May, 1997

Attest:

BRUCE LEHMAN

Attesting Officer          Commissioner of Patents and Trademarks